United States Patent
Kobayashi et al.

(10) Patent No.: US 11,624,994 B2
(45) Date of Patent: Apr. 11, 2023

(54) FIXING BELT AND FIXING APPARATUS

(71) Applicant: CANON KABUSHIKI KAISHA, Tokyo (JP)

(72) Inventors: Noriaki Kobayashi, Ibaraki (JP); Akeshi Asaka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/725,238

(22) Filed: Apr. 20, 2022

(65) Prior Publication Data

US 2022/0342353 A1  Oct. 27, 2022

(30) Foreign Application Priority Data

Apr. 27, 2021 (JP) .............................. JP2021-075335
Mar. 23, 2022 (JP) .............................. JP2022-047656

(51) Int. Cl.
*G03G 15/20* (2006.01)
*C09C 1/40* (2006.01)
*C09D 5/44* (2006.01)

(52) U.S. Cl.
CPC ......... *G03G 15/2057* (2013.01); *C09C 1/405* (2013.01); *C09D 5/4461* (2013.01); *G03G 15/2064* (2013.01); *G03G 2215/2035* (2013.01)

(58) Field of Classification Search
USPC ........................................................ 399/122
See application file for complete search history.

(56) References Cited

U.S. PATENT DOCUMENTS

| | | | |
|---|---|---|---|
| 5,083,168 | A | 1/1992 | Kusaka et al. |
| 5,149,941 | A | 9/1992 | Hirabayashi et al. |
| 5,162,634 | A | 11/1992 | Kusaka et al. |
| 5,262,834 | A | 11/1993 | Kusaka et al. |
| 5,300,997 | A | 4/1994 | Hirabayashi et al. |
| 5,343,280 | A | 8/1994 | Hirabayashi et al. |
| 5,767,484 | A | 6/1998 | Hirabayashi et al. |
| 6,564,033 | B2 | 5/2003 | Zhou et al. |
| 7,212,776 | B2 | 5/2007 | Takagi et al. |
| 7,376,379 | B2 | 5/2008 | Takahashi et al. |
| 9,057,992 | B2 | 6/2015 | Ishii et al. |
| 9,256,176 | B2 | 2/2016 | Miyahara |

(Continued)

FOREIGN PATENT DOCUMENTS

| | | |
|---|---|---|
| JP | 63-313182 A | 12/1988 |
| JP | 2-157878 A | 6/1990 |

(Continued)

*Primary Examiner* — Quana Grainger
(74) *Attorney, Agent, or Firm* — Venable LLP

(57) ABSTRACT

A fixing belt includes: a base having an endless shape; and a resin layer covering a surface on an inner peripheral side of the base, the resin layer comprising a resin and a filler, and having a second surface opposite to a first surface facing the base, the second surface having cell structures, and being roughened with the filler. When arithmetic mean roughnesses of the second surface in the central region X and the end regions Y and Z are defined as RaX, RaY and RaZ respectively, a difference between RaX and RaY, a difference between RaY and RaZ, and a difference between RaX and RaZ are all 0.1 μm or smaller, and a coefficient of variation of areas of the cell structures contained in each of the central region X, and end regions Y and Z is 25% or smaller.

9 Claims, 8 Drawing Sheets

(56) References Cited

U.S. PATENT DOCUMENTS 10,444,655 B2 10/2019 Saito et al.
2003/0224192 A1* 12/2003 Tani .................... G03G 7/0033
428/485

FOREIGN PATENT DOCUMENTS

| | | |
|---|---|---|
| JP | 2002-258648 A | 9/2002 |
| JP | 2005-121825 A | 5/2005 |
| JP | 2008-139777 A | 6/2008 |
| JP | 2014-153487 A | 8/2014 |
| JP | 2014-228729 A | 12/2014 |
| JP | 2018-136434 A | 8/2018 |
| JP | 2020-197670 A | 12/2020 |
| WO | 2005/054960 A1 | 6/2005 |

* cited by examiner

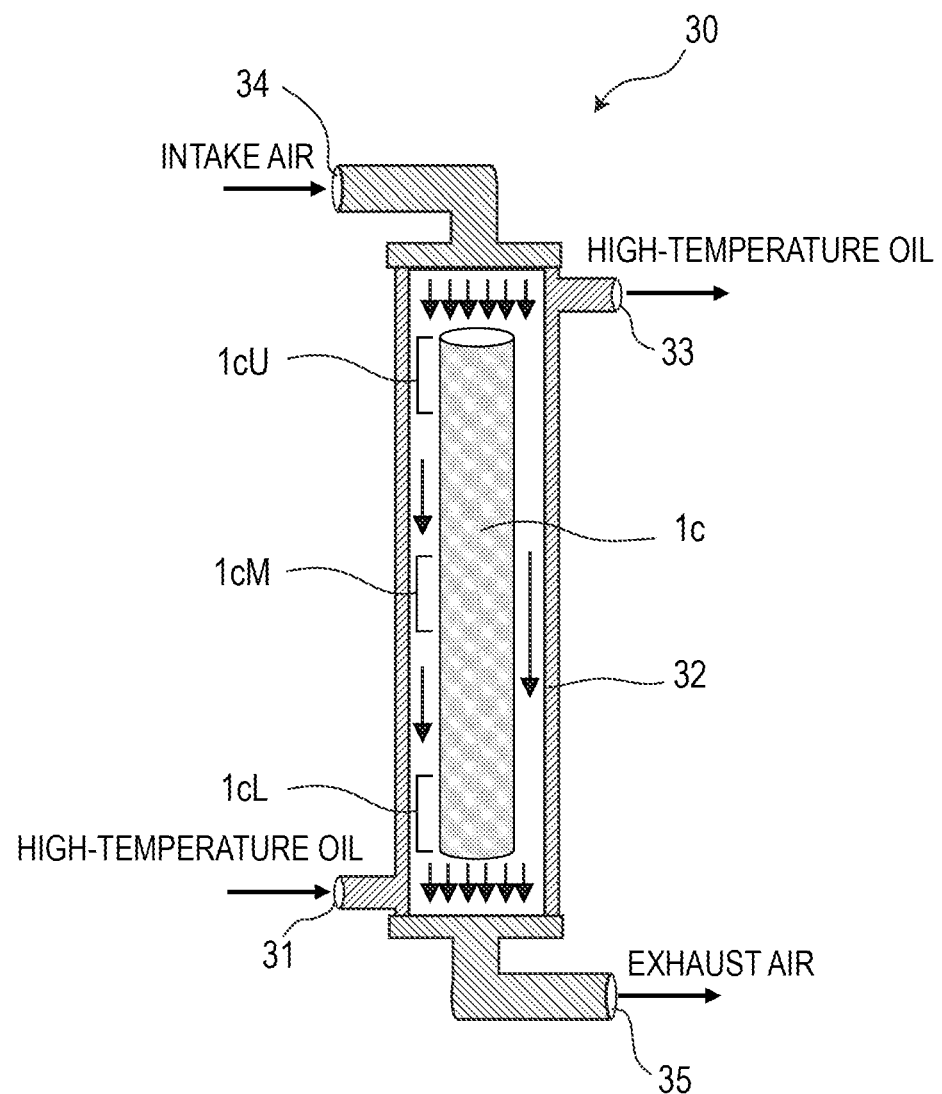

FIG. 7
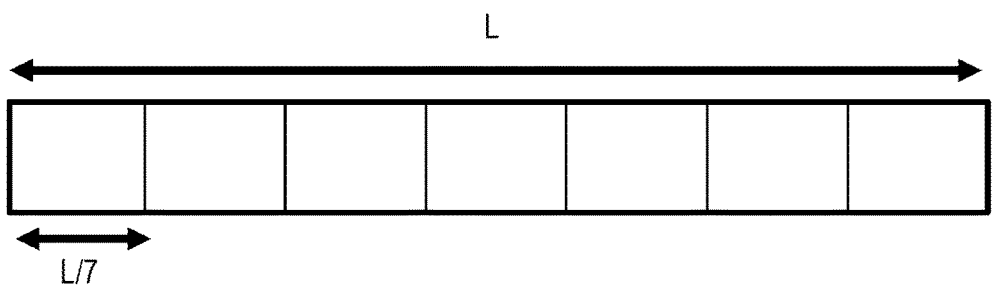
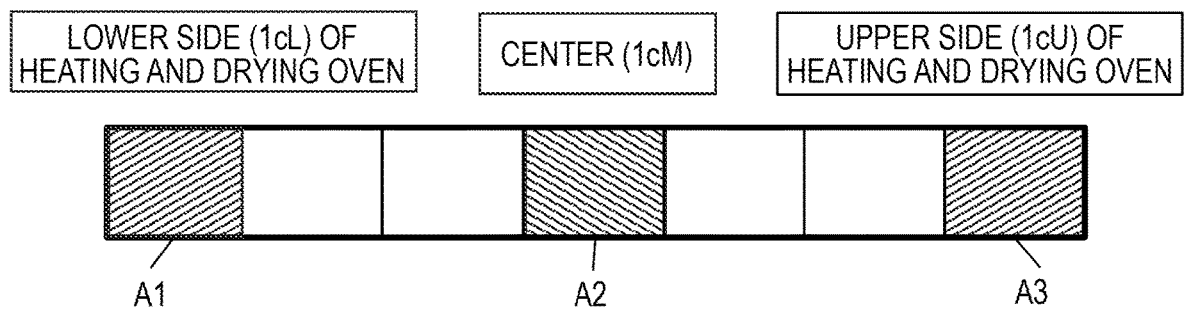

FIXING BELT AND FIXING APPARATUS

BACKGROUND

Technical Field

The present disclosure relates to a fixing belt that is used for a thermal fixing apparatus of an electrophotographic image forming apparatus, and a fixing apparatus.

Description of the Related Art

As a fixing apparatus for an electrophotographic image forming apparatus, a fixing roller system has been generally used in the past, but the fixing roller has a large thermal capacity, needs a long time for being heated, takes a long waiting time at the time of starting, and also consumes much electric power. For this reason, in recent years, as an on-demand system in which a heat transfer efficiency is high and a start-up of an apparatus is fast, a belt heating type of fixing apparatus has been adopted, which heats the toner on a transfer paper by heat of a heater through a fixing belt having a small thermal capacity.

A belt heating type of fixing apparatus described in any of Japanese Patent Application Laid-Open No. S63-313182 and Japanese Patent Application Laid-Open No. H02-157878 includes: a heating member; a heat transfer member that slides with the heating member; and a pressure member that is pressed against the heating member through the heat transfer member and forms a fixing nip portion together with the heating member. The fixing apparatus introduces a recording material having an unfixed toner image carried thereon, into a fixing nip portion, and fixes the unfixed toner image to the recording material by heat transferred from the heating member through the heat transfer member. Examples of the heating member include a ceramic heater. In addition, examples of the heat transfer member include a fixing belt. Furthermore, examples of the pressure member include an elastic pressure roller.

Here, one example of the fixing belt is a fixing belt including: a substrate which has a small thermal capacity and has a thin endless shape; a silicone rubber elastic layer for applying a uniform pressure to the unevenness of the toner image and the paper at the time of fixing; and a fluororesin release layer for keeping releasability from the toner.

In the fixing apparatus described in Japanese Patent Application Laid-Open No. H02-157878, a heating body is provided which is fixed and supported in the inside of a fixing film (fixing belt) having an endless shape, the fixing belt and a recording material having an unfixed toner image carried thereon are sandwiched and conveyed between the heating body and the elastic pressure roller, and the toner image is fixed to the recording material. Because of this, friction and abrasion occur between the inner peripheral surface of the fixing belt and the fixed and supported heating body. As a result, as the abrasion progresses, self-excited vibration (film squeal) called stick-slip or a torque increase occur in some cases.

Japanese Patent Application Laid-Open No. 2014-228729 discloses a fixing belt that is used for heating and fixing a toner image on a recording material while the inner surface side rotates while sliding on a backup member, and includes a cylindrical substrate formed from metal, and a sliding layer that is formed on the inner peripheral surface side of the cylindrical substrate, slides on the backup member, and is formed of a heat-resistant resin. The sliding layer contains a shape anisotropic filler having an aspect ratio of 5 or larger, which is oriented so that the longitudinal direction of the filler becomes substantially parallel to the longitudinal direction of the fixing belt. Furthermore, it is disclosed that it is preferable to control the ten-point average roughness Rzjis of the surface of the sliding layer, which slides with the backup member, to a value exceeding 2 μm and less than 5 μm.

On the other hand, in Japanese Patent Application Laid-Open No. 2018-136434, a charging member for electrophotographic equipment, which includes an elastic layer and a surface layer formed on the outer periphery of the elastic layer, wherein the surface layer includes: a polyamide and a modifier having a hydroxyl group, wherein the modifier having the hydroxyl group is at least one of a fluorine-based modifier, a silicone-based modifier and an acryl-based modifier; and a Benard cell having a height of 0.1 to 1.0 μm on the surface of the surface layer.

The present inventors have studied a method for forming the sliding layer that contains a polyimide resin as a binder and fillers that have a large aspect ratio and are dispersed in the binder, which is described in Example of Japanese Patent Application No. 2014-228729.

In this process, the present inventors have found that a vortex flow can be generated in the coated film, by controlling drying conditions of the coated film of the coating material for forming the sliding layer, in which a filler having a large aspect ratio is added to a polyimide precursor, and that the longitudinal direction of the filler can be tilted to the thickness direction of the coated film, by the flow of the filler in the coated film, which is caused by the vortex flow. The sliding layer formed by baking of such a coated film has a plurality of cell structures, and at least a part of the filler exists in the vicinity of the boundary of each cell structure so that the longitudinal direction of the filler tilts in the thickness direction of the sliding layer, and the fillers of which the longitudinal direction are tilted to the thickness direction can roughen the inner peripheral surface of the sliding layer so as to have a predetermined roughness.

However, as a result of further studies, the present inventors have found a new problem that there is a case where the roughness of the inner peripheral surface of the sliding layer which has been formed by such a method becomes non-uniform in a direction perpendicular to the circumferential direction (hereinafter also referred to as "longitudinal direction") of the fixing belt.

SUMMARY

At least one aspect of the present disclosure is directed to providing a fixing belt having an endless shape, in which the surface roughness of the inner peripheral surface is more uniformalized in the longitudinal direction. Another aspect of the present disclosure is directed to providing a fixing apparatus that can stably form a high-quality electrophotographic image.

According to one aspect of the present disclosure, there is provided a fixing belt including: a base having an endless shape; and a resin layer covering a surface on an inner peripheral side of the base. The resin layer contains a resin and a filler, and having a second surface opposite to a first surface facing the base. The second surface has cell structures, and is roughened with the filler. When a length of the fixing belt in a longitudinal direction is defined as L, a region which whose center is a middle point of the fixing member in the longitudinal direction and having a width of L/7 is defined as a central region X, regions having a width of L/7 from both ends of the fixing belt in the longitudinal direction toward the middle point are defined as end regions Y and Z respectively, and when arithmetic mean roughnesses of the second surface in the central region X and the end regions Y and Z are defined as RaX, RaY and RaZ respectively, a difference between RaX and RaY, a difference between RaY and RaZ, and a difference between RaX and RaZ are all 0.1 µm or smaller, and a coefficient of variation of areas of the cell structures contained in each of the central region X and the end regions Y and Z is 25% or smaller.

According to another aspect of the present disclosure, there is provided a fixing belt including: a base having an endless shape; and a resin layer covering a surface on an inner peripheral side of the base. The resin layer is a cured film of a coated film of a coating material for forming the resin layer. The coating material contains a filler and a resin raw material. The resin layer has a second surface opposite to a first surface facing the base. The second surface has cell structures derived from a convection type cell structure, and is roughened with the filler. When a length of the fixing belt in a longitudinal direction is defined as L, a region whose center is a middle point of the fixing member in the longitudinal direction and having a width of L/7 is defined as a central region X, and regions having a width of L/7 from both ends of the fixing belt in the longitudinal direction toward the middle point are defined as end regions Y and Z respectively, a coefficient of variation of areas of the cell structures contained in each of the central region X and the end regions Y and Z is 25% or smaller.

In addition, according to still another aspect of the present disclosure, a fixing apparatus including the above fixing belt is provided.

Further features of the present disclosure will become apparent from the following description of exemplary embodiments with reference to the attached drawings.

BRIEF DESCRIPTION OF THE DRAWINGS

FIG. 5 illustrates a schematic view of a drying apparatus for a sliding layer used in the present Example.

FIG. 7 illustrates a schematic diagram illustrating a region in which cell areas are measured.

DESCRIPTION OF THE EMBODIMENTS

Figure 1:
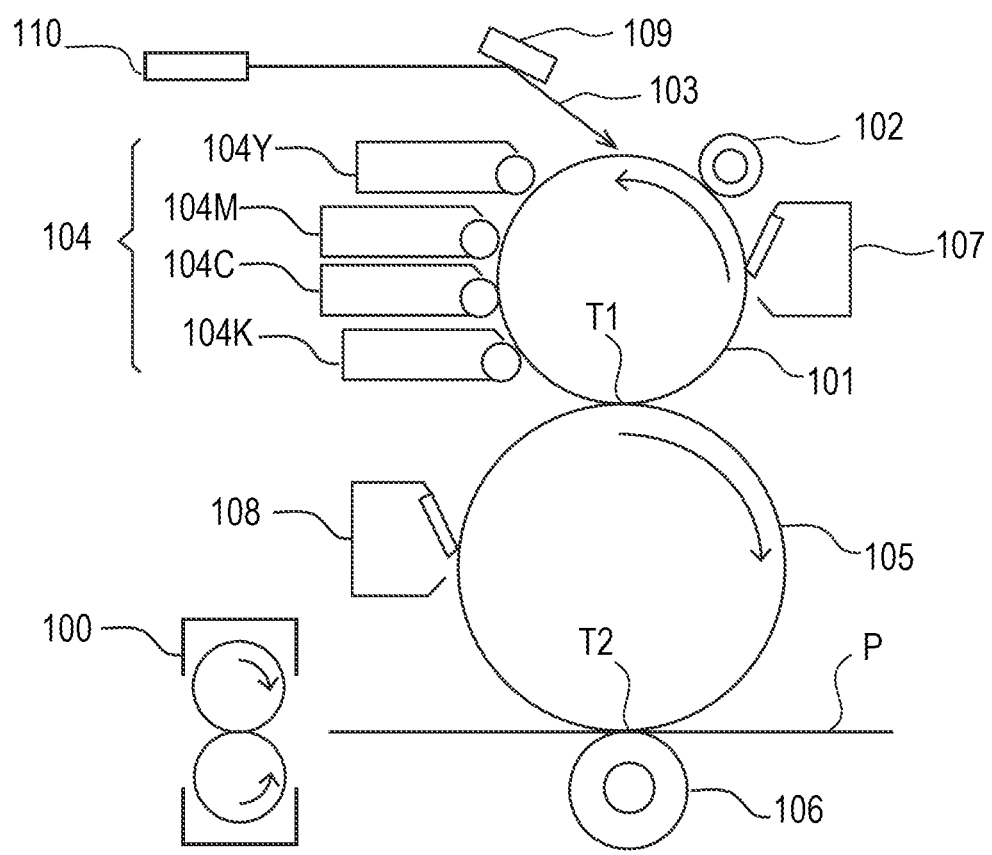
FIG. 1 illustrates a schematic cross-sectional view of an electrophotographic image forming apparatus used in the present Example.

Preferred embodiments of the present disclosure will now be described in detail in accordance with the accompanying drawings.

In the present disclosure, the description of "XX or larger and YY or smaller" and "XX to YY", which represent a numerical range, means a numerical range that includes a lower limit and an upper limit which are end points, unless otherwise specified. In addition, in the case where numerical ranges are described in stages, the above description discloses arbitrary combination of the upper limit and the lower limit of each numerical range.

The reason why the surface roughness of the inner peripheral surface of the sliding layer formed by the method including the above controlled drying step of the coated film of the coating material for forming the sliding layer becomes non-uniform in the longitudinal direction of the fixing belt is assumed as follows. Specifically in the method, it is considered that the drying condition of the coated film gives influence on a shape of the cell structure, and as a result, gives influence on the surface roughness of the inner peripheral surface of the sliding layer. In addition, in the drying step of the coated film formed on the inner peripheral surface of the substrate having the endless shape, for example, when the substrate is arranged horizontally, the concentration of the solvent which has evaporated from the coated film can be different between the center and the end of the inside of the substrate in the longitudinal direction. In addition, when the substrate has been arranged so that its longitudinal direction is along the vertical direction, the concentration of the solvent vaporized from the coated film inside the substrate can be different between the vertical upper portion and vertical lower portion of the substrate. It is considered that a drying speed of the coated film changes according to such a difference in the concentration of the solvent vapor, and as a result, the shape of the cell structure and consequently the orientation state of the filler change in the longitudinal direction of the substrate. Because of this, the surface roughness of the inner peripheral surface of the sliding layer is considered to become non-uniform in the longitudinal direction of the fixing belt.

Based on such consideration, the present inventors have studied uniformalizing drying conditions of the coated film in the longitudinal direction of the substrate having the endless shape. As a result, the present inventors have found that the roughness of the inner peripheral surface of the sliding layer can be uniformalized in the longitudinal direction of the fixing belt.

A fixing belt according to one embodiment of the present disclosure has a base having an endless shape, and a resin layer (sliding layer) covering a surface on the inner peripheral side (inner peripheral surface) of the base. A second surface (hereinafter also referred to as "inner peripheral surface") opposite to a first surface of the resin layer, the first surface facing the base, has a plurality of cell structures. The resin layer contains a resin and a filler, and the second surface is roughened by the filler. Then, when L represents a length of the fixing belt in the longitudinal direction, a central region X represents a region which has a width of L/7 and of which a center thereof is a middle point of the fixing belt in the longitudinal direction, and end regions Y and Z represent regions having a width of L/7 from both ends of the fixing belt in the longitudinal direction toward the middle point, respectively, and when RaX, RaY and RaZ represent arithmetic mean roughnesses of the second surface in the central region X and the end regions Y and Z, respectively, a difference between RaX and RaY, a difference between RaY and RaZ, and a difference between RaX and RaZ are all 0.1 µm or smaller. In addition, a coefficient of variation of areas of the cell structures contained in each of the central region X and the end regions Y and Z is 25% or smaller.

A fixing belt according to another embodiment of the present disclosure has a base having an endless shape, and a resin layer (sliding layer) covering a surface on the inner peripheral side of the base. The resin layer is a cured film of a coated film of a coating material for forming the resin layer, the coating material containing a filler and a resin raw material. A second surface, that is, the inner peripheral surface, opposite to the first surface of the resin layer, the first surface facing the base, has a plurality of cell structures derived from a convection type cell structure, and the second surface is roughened by the filler. When L represents a length of the fixing belt in the longitudinal direction, a central region X represents a region which has a width of L/7 and of which the center is a middle point of the fixing belt in the longitudinal direction, and end regions Y and Z represent regions having a width of L/7 from both ends of the fixing belt in the longitudinal direction toward the middle point, respectively, a coefficient of variation of areas of the cell structures contained in each of the central region X and the end regions Y and Z is 25% or smaller.

In the fixing belt according to each of the above embodiments, an expression that the inner peripheral surface of the sliding layer is "roughened" means that the arithmetic mean roughnesses RaX, RaY and RaZ of the inner peripheral surface are each preferably 0.15 μm or larger. For information, in the fixing belt according to the present disclosure, it is preferable that RaX, RaY and RaZ are each 0.70 μm or smaller. Specifically, it is preferable that the RaX, RaY and RaZ are 0.15 μm or larger, and 0.70 μm or smaller. In particular, it is preferable that the RaX, RaY and RaZ are 0.25 μm or larger and 0.55 μm or smaller.

In addition, a coefficient of variation of areas of the cell structures (hereinafter also described as "cell areas") is calculated by the following formula:

Coefficient of variation of cell areas=(standard deviation of cell areas)/(arithmetic mean value of cell areas)

Embodiments for carrying out the present disclosure will be described below with reference to the drawings, but the scope of the present disclosure is not limited to this embodiment, and modifications in such an extent as not to impair the spirit of the present disclosure are also included in the present disclosure.

(1) Outline of Configuration of Electrophotographic Image Forming Apparatus

FIG. 1 illustrates a schematic cross-sectional view of an electrophotographic image forming apparatus according to one embodiment of the present disclosure. A photosensitive drum 101 serving as an image carrying body is rotationally driven at a predetermined process speed (peripheral speed) in a counterclockwise direction. The photosensitive drum 101 is electrically charged to a predetermined polarity by a charging member 102 such as a charging roller, in its rotation process. Next, the electrically charged surface of the photosensitive drum is exposed by a laser light 103 which is output from an exposure apparatus 110, based on input image information. The exposure apparatus 110 outputs a laser beam 103 that is modulated (on/off) so as to correspond to a time series electric digital pixel signal of target image information sent from an image signal generating apparatus such as an unillustrated image reading apparatus. In addition, a mirror 109 deflects the laser light 103 so that the exposure apparatus 110 irradiates a predetermined position on the surface of the photosensitive drum 101 with the laser light. Then, the surface of the photosensitive drum 101 is scanned with a laser beam 103, and is exposed to light. As a result, an electrostatic latent image (unillustrated) corresponding to the image information is formed on the surface of the photosensitive drum 101.

The electrostatic latent image formed on the photosensitive drum 101 is visualized with yellow toner by, for example, a yellow developing device 104Y in a developing apparatus 104. The visualized yellow toner image is transferred to a surface of an intermediate transfer drum 105 at a primary transfer portion T1 which is a contact portion between the photosensitive drum 101 and the intermediate transfer drum 105. A toner remaining on the surface of the photosensitive drum 101 is cleaned by a cleaner 107.

A process cycle of the electric charging, exposure, development, primary transfer and cleaning as described above is repeated in the same manner so as to form a magenta toner image (when developing device 104M operates), a cyan toner image (when developing device 104C operates), and a black toner image (when developing unit 104K operates). In this way, the toner images of the respective colors formed on the surface of the intermediate transfer drum 105 are secondarily transferred collectively onto the recording material P at a secondary transfer portion T2 which is a contact portion with a transfer roller 106. The toner remaining on the intermediate transfer drum 105 is cleaned by a toner cleaner 108.

For information, the cleaner 108 is configured to be contactable with and separable from the intermediate transfer drum 105, and to be in a state in contact with the intermediate transfer drum 105 only at the time when the intermediate transfer drum 105 is cleaned. In addition, the transfer roller 106 is also configured to be contactable with and separable from the intermediate transfer drum 105, and to be in a state in contact with the intermediate transfer drum 105 only at the time of secondary transfer. The recording material P having passed through the secondary transfer portion T2 is introduced into a fixing apparatus 100 which serves as an image heating apparatus, and an unfixed toner image carried thereon is subjected to fixing processing (image heating treatment). Then, the recording material P which has been subjected to the fixing processing is discharged to the outside of the machine, and a series of image forming operations is completed.

(2) Outline of Configuration of Fixing Apparatus

Figure 2:
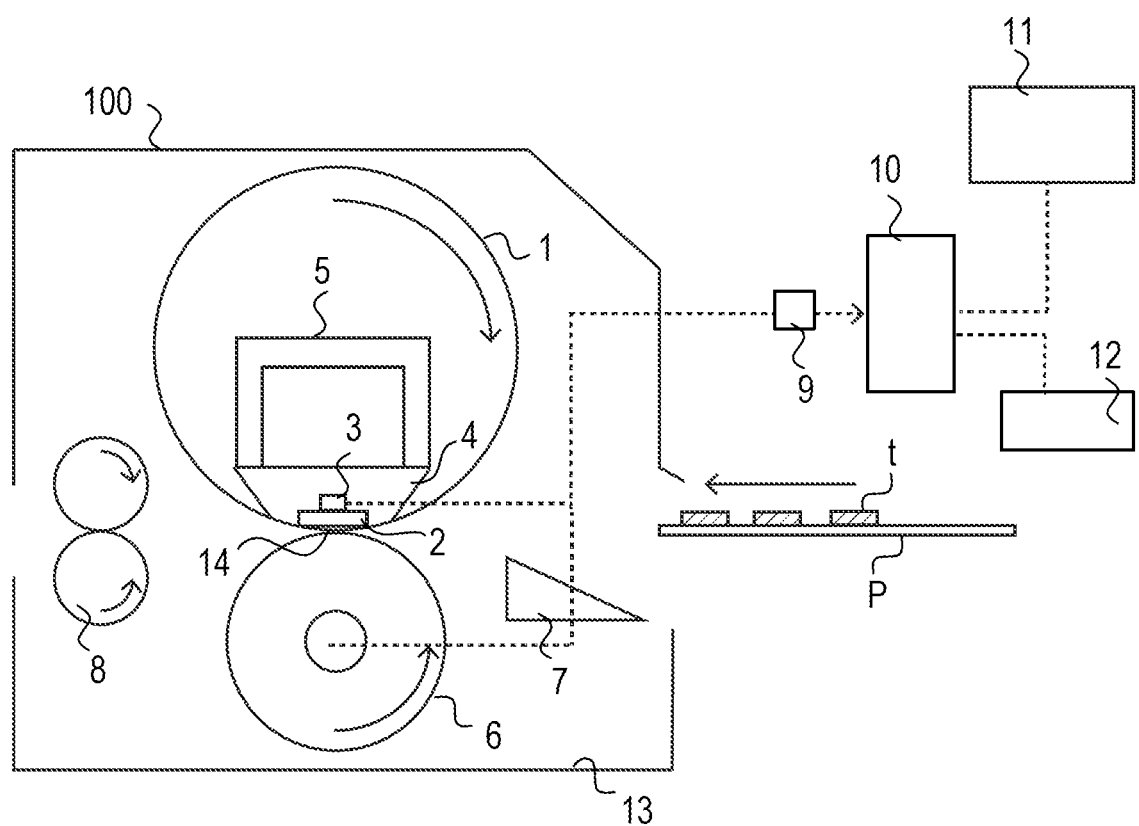
FIG. 2 illustrates a schematic cross-sectional view of a fixing apparatus used in the present Example.

FIG. 2 illustrates a schematic cross-sectional view of the fixing apparatus 100. The fixing belt 1 has an elastic layer and has an endless shape. A pressure roller 6 is a pressure member for forming a fixing nip portion 14 between the pressure roller 6 and the fixing belt. A fixing heater 2 is a heating body, and a film guide/heater holder 4 has heat resistance. The fixing heater 2 is fixed to a lower surface of the film guide/heater holder 4 along the length of the film guide/heater holder 4, and is configured so that the inner peripheral surface of the fixing belt 1 and the heating surface thereof are slidable. The fixing belt 1 is externally fitted to the film guide/heater holder 4 with some degree of freedom. The film guide/heater holder 4 is formed of a liquid crystal polymer resin having a high heat resistance, and plays a role in holding the fixing heater 2 and also separating the fixing belt 1 from the recording material P.

The pressure roller 6 has such a structure that a silicone rubber layer having a thickness of 3 mm and a PFA resin tube having a thickness of 40 μm are sequentially laminated on an electro-conductive substrate (core metal) made from stainless steel (SUS304). Both end portions of the core metal of the pressure roller 6 are rotatably held by bearings between an unillustrated side plate in the back side and an unillustrated side plate in the front side of an apparatus frame 13. On an upper side of the pressure roller 6, a fixing unit is installed which includes the fixing heater 2, the film guide/heater holder 4, a fixing belt stay 5, and the fixing belt 1. The fixing unit is installed parallel to the pressure roller 6 so that the fixing heater 2 faces downward. Both end portions of the fixing belt stay 5 are pressed against the pressure roller 6 by an unillustrated pressure mechanism with forces of 156.8 N (16 kgf) at one end and 313.6 N (32 kgf) in total pressure. As a result, the lower surface (heating surface) of the fixing heater 2 is pressed against the elastic layer of the pressure roller 6 through the fixing belt 1 with a predetermined pressing force, and thereby a fixing nip portion 14 is formed which has a predetermined width necessary for fixing. On the downstream side of the fixing nip portion 14, a pair of conveying rollers 8 for conveying the paper are provided which has passed through the fixing nip portion 14.

A thermistor 3 is a temperature detecting unit. The thermistor 3 (heater temperature sensor) is installed on the back surface (surface on opposite side of heating surface) of the fixing heater 2 which is a heat source, and has a function of detecting the temperature of the fixing heater 2. The pressure roller 6 is rotationally driven at a predetermined peripheral speed in the direction of the arrow (counterclockwise direction). The fixing belt 1 is rotated at a predetermined speed while following the pressure roller 6. At this time, the fixing belt 1 is in a state of being driven to rotate on the outer periphery of the film guide/heater holder 4 in the direction of the arrow (clockwise direction), while its inner surface comes in close contact with the lower surface of the fixing heater 2 and slides.

A semi-solid lubricant which will be described later is applied on the inner peripheral surface of the fixing belt 1 to ensure slidability between the film guide/heater holder 4 and the inner surface of the fixing belt 1. The thermistor 3 is arranged so as to contact the back surface of the fixing heater 2, and is connected to a control circuit unit (CPU) 10 serving as a control unit through an A/D converter 9. The control circuit unit (CPU) 10 is configured to sample an output from each of the thermistors at a predetermined cycle, and reflect the obtained temperature information to temperature control. Specifically, the control circuit unit (CPU) 10 determines a content of the temperature control of the fixing heater 2, based on the output of the thermistor 3, and controls the energization to the fixing heater 2 by a heater driving circuit section 11 which is a power supply section so that the temperature of the fixing heater 2 becomes a target temperature (set temperature). In addition, the control circuit unit (CPU) 10 also plays a role of controlling a sequence of estimation of the fixing belt life, which will be described later, and is connected to a driving motor of the pressure roller 6 through the A/D converter 9. The fixing heater 2 includes: an alumina substrate; and a resistance heating element that is coated on the substrate in a film form having a uniform thickness of about 10 µm, with an electro-conductive paste which contains a silver-palladium alloy, by screen printing. The fixing heater 2 is configured to be a ceramic heater which is further coated with glass of a pressure-resistant glass.

(3) Outline of Configuration of Fixing Belt

Figure 3:
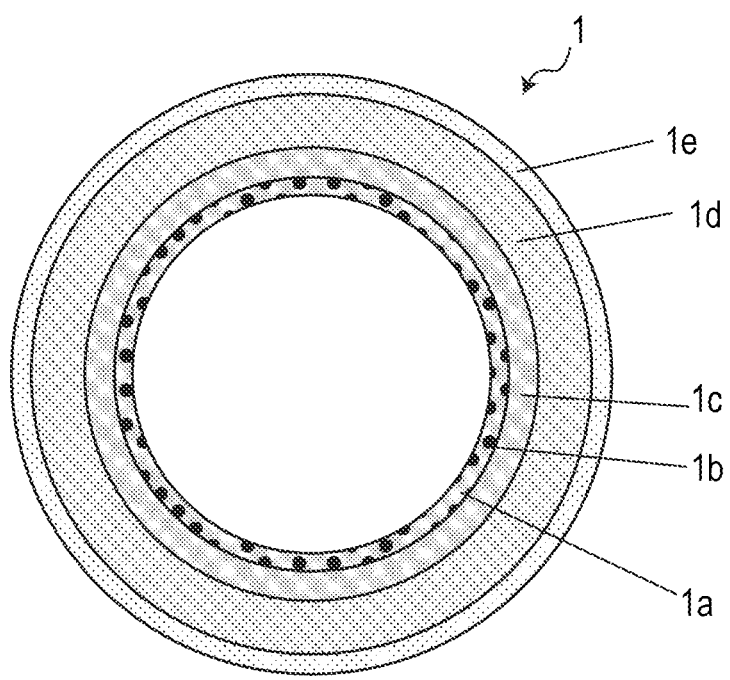
FIG. 3 illustrates a schematic diagram of a fixing belt used in the present Example.

FIG. 3 is a schematic cross-sectional view in a direction parallel to the circumferential direction of the fixing belt 1 that has an endless shape, according to one embodiment of the present disclosure. A sliding layer 1b is placed on the inner peripheral surface of the cylindrical substrate 1c through an unillustrated adhesive layer. The sliding layer 1b includes a filler 1a having a predetermined aspect ratio. A silicone rubber elastic layer 1d is placed on the outer peripheral surface of the cylindrical substrate 1c, through an unillustrated primer layer. A fluororesin tube 1e serving as a fluororesin surface layer is placed on the outer peripheral surface of the silicone rubber elastic layer 1d, through an unillustrated silicone rubber adhesive layer.

(4) Cylindrical Substrate

The fixing belt is required to have heat resistance, and accordingly, it is preferable to use a substrate made from metal which is excellent in heat resistance and bending resistance, or a substrate formed from a heat-resistant resin, as the cylindrical substrate 1c. For example, as the metal substrate, a metal such as electroformed nickel or stainless steel can be used, as described in Japanese Patent Application Laid-Open No. 2002-258648, International Publication No. WO2005/054960, and Japanese Patent Application Laid-Open No. 2005-121825. In the present Example, stainless steel (SUS304) was used.

(5) Sliding Layer

As a resin contained in the resin layer constituting the sliding layer 1b, a resin having high durability and high heat resistance is suitable such as a polyimide resin, a polyamideimide resin and a polyetheretherketone resin. In particular, the polyimide resin is preferable because of being easy to manufacture and being excellent in the heat resistance, elastic modulus, strength and the like.

In addition, it is preferable that a second surface (inner peripheral surface) opposite to a first surface of the sliding layer 1b, the first surface facing the substrate, is roughened in order to improve sliding properties between the sliding layer and the fixing heater. The filler for surface roughening will be described later.

(5-1) Solution of Polyimide Precursor

The sliding layer can be formed by operations of: preparing a coating material for forming the sliding layer, which includes a solution of a polyimide precursor, which is obtained by a reaction between approximately equimolar amounts of an aromatic tetracarboxylic dianhydride or a derivative thereof and an aromatic diamine in an organic polar solvent; forming a coated film of the coating material, on the inner surface of the cylindrical substrate 1c; and drying and heating the coated film to cause a dehydration ring-closing reaction therein.

Representative examples of the aromatic tetracarboxylic acid include the following substances: Pyromellitic dianhydride, 3,3',4,4'-biphenyltetracarboxylic dianhydride, 3,3',4,4'-benzophenonetetracarboxylic dianhydride, 2,3,6,7-naphthalenetetracarboxylic dianhydride, and the like. These aromatic tetracarboxylic acids can be used alone or in combination of two or more types thereof.

Examples of aromatic diamines include 4,4'-diaminodiphenyl ether, para-phenylene diamine, and benzidine. These aromatic diamines may be used alone or in combination of two or more types thereof.

Examples of the organic polar solvent include dimethylacetamide, dimethylformamide, N-methyl-2-pyrrolidone, phenol, O-cresol, M-cresol and P-cresol.

(5-2) Additive Agent (Filler)

As the filler that is contained in the sliding layer and roughens the inner peripheral surface of the sliding layer, a filler is preferably used which has an aspect ratio of 5 to 50.

When the film thickness of the sliding layer is 8 μm to 20 μm, it is preferable for the particle size to be smaller than 4.5 μm, in order to develop the cell.

As the filler to be contained in the sliding layer, it is preferable to select a material excellent in lubricating performance so that the sliding layer can carry a lubrication property. In addition, it is preferable that the filler can impart an excellent abrasion resistance to the sliding layer, and does not induce the abrasion of the sliding related member even when having been detached from the sliding layer. From these viewpoints, as the filler contained in the sliding layer, for example, polytetrafluoroethylene, graphite, molybdenum disulfide and mica are preferably used.

(5-3) Method for Forming Sliding Layer

Examples of a method for forming the coated film of the coating material for forming the sliding layer on the inner peripheral surface of the substrate having the endless shape include a ring coating method.

Figure 4:
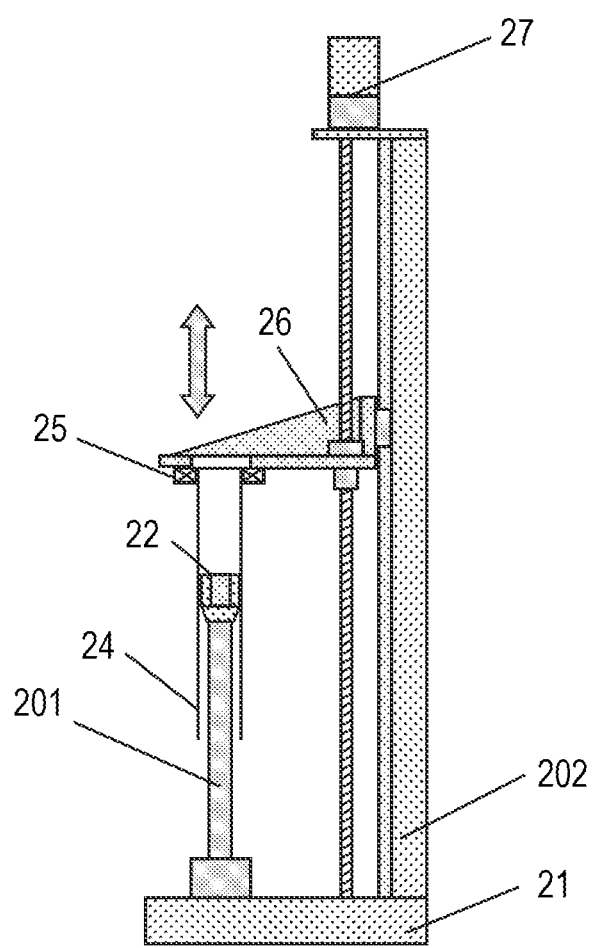
FIG. 4 illustrates a schematic view of a ring coating apparatus used in the present Example.

FIG. 4 is a schematic view of a coating apparatus which is used in the ring coating method. Pillars 201 and 202 are formed on a base 21. A coating head 22 is fixed on the pillar 201, and a coating liquid supply apparatus is connected (unillustrated).

A work hand 25 holds the cylindrical substrate 1c. A work moving apparatus 26 can be moved up and down by a driving motor 27 provided on the pillar 202. The work hand 25 which is provided in the work moving apparatus 26 can also move up and down together with the work moving apparatus 26, in a state of holding the cylindrical substrate 1c.

A slit (unillustrated) is formed on an outer peripheral surface of the coating head 22 in a direction orthogonal to the axial direction of the pillar 201, and from the slit, a coating material for forming the sliding layer, in which an additive agent containing the filler is blended, is uniformly supplied. Then, the cylindrical substrate 1c is moved up and down along the outer periphery of the coating head 22, and thereby the coating material for forming the sliding layer is applied to the inner peripheral surface of the cylindrical substrate 1c. In this apparatus, the thickness of the sliding layer is determined by the thickness of the coated film of the coating material for forming the sliding layer. The thickness of the coated film of the coating material for forming the sliding layer can be adjusted arbitrarily by controlling: a clearance between the outer peripheral surface of the coating head 22 and the inner peripheral surface of the cylindrical substrate 1c; a supply speed (quantity supplied per unit time) of the solution of the polyimide precursor; a moving speed of the work moving apparatus 26; and the like.

FIG. 5 illustrates a schematic configuration of a drying apparatus (heating and drying oven) 30. The substrate 1c of which the inner peripheral surface has the coated film of the coating material for forming the sliding layer formed thereon is charged into the heating and drying oven illustrated in FIG. 5, and is dried. A high-temperature oil heated to 120 to 200° C. is injected from an oil injection port 31, is passed through a flow path (unillustrated) in a heating cylinder 32, and is discharged from an oil discharge port 33; and thereby a temperature in the heating cylinder 32 is controlled to 100 to 180° C. Then, the solvent contained in the coated film formed on the inner peripheral surface of the substrate 1c is volatilized which has been charged into the heating cylinder 32. Specifically, the content of the solvent in the coated film is reduced, for example, to less than 30% by volume with respect to that in the coated film immediately after coating. Thereby, the outflow of the coated film from the inner peripheral surface of the substrate 1c can be suppressed. Specifically, it is preferable to charge the substrate 1c on which the coated film has been formed, into the heating and drying oven 30 for approximately 300 seconds, for example, and thereby to volatilize the solvent.

The solvent in the coated film is reduced in this way; then, the substrate 1c is left at rest in a hot-air circulating oven which is adjusted to a temperature range of 200 to 240° C., for 5 to 60 minutes; subsequently, the temperature in the hot-air circulating oven is raised to 350 to 400° C.; the substrate 1c is left at rest there for 10 to 60 minutes; and the dried coated film is baked. By doing so, bumping of the coated film can be prevented, and a uniform sliding layer containing polyimide can be formed.

Figure 8:
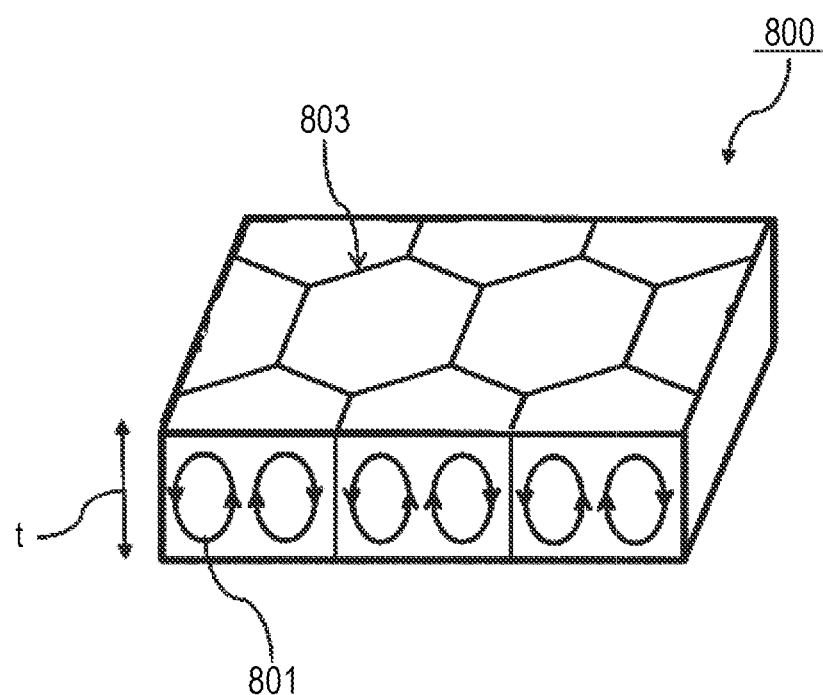
FIG. 8 illustrates a schematic view illustrating cell structures formed by a controlled drying step of a coated film of a coating material for forming a sliding layer.

In addition, in the formation of the sliding layer according to the present disclosure, it becomes important to control drying conditions in a drying step of the coated film of the coating material for forming the sliding layer, which has been formed on the inner peripheral surface of the cylindrical substrate 1c. Specifically, the second surface (inner peripheral surface) opposite to the first surface of the sliding layer according to the present disclosure, the first surface facing the substrate, includes a plurality of cell structures that have been formed by convection such as Benard convection and Marangoni convection, and have been generated in the coated film in the drying step and baking step of the coated film of the coating material for forming the sliding layer. When such a cell structure is formed, for example, in a case where the substrate 1c is arranged in the heating and drying oven so that the longitudinal direction thereof is oriented to the vertical direction, and is dried, as is illustrated in FIG. 5, there is a case where the vapor concentration of the solvent having vaporized from the coated film differs between the vertical upper portion and the vertical lower portion in the heating and drying oven. When the coated film is dried in a such state that there is a gradient in the vapor concentration of the solvent, the drying speed of the coated film is different between the vertically upper part and vertically lower part of the coated film, and accordingly the area of the cell structure to be formed becomes different. When the coated film contains a filler having a high aspect ratio, in the cell structure 803 as illustrated in FIG. 8, which has been formed due to the convection 801 that has been generated in the coated film due to the control of drying conditions of the coated film 800, the filler tends to exist in the vicinity of the boundary between adjacent cell structures so that its longitudinal direction is oriented to the thickness direction (direction of arrow t in FIG. 8) of the coated film. This filler is considered to mainly determine the surface roughness of the second surface of the sliding layer. For this reason, when the area of the cell structures differs, the surface roughness in the longitudinal direction of the inner peripheral surface can become non-uniform according to the difference.

Then, in the present disclosure, in the drying step of the coated film, it is preferable to allow a gas, for example, air to flow, for example, in a direction which is indicated by an arrow A in FIG. 5, in a heating and drying oven so that the vapor concentration of the solvent in the cylindrical substrate becomes uniform in the longitudinal direction. Note that the flow direction is not limited to the direction shown in FIG. 5, and may be a direction from a vertical downward direction to a vertical upward direction.

In addition, the wind velocity is not particularly limited as long as the solvent vapor can be allowed to flow, but is preferably 0.5 m/s or larger, for example. For information, here, the example has been described in which the cylindrical substrate 1c is arranged so that its longitudinal direction becomes parallel to the vertical direction as illustrated in FIG. 5, but it is considered that the concentration gradient of the solvent vapor in the longitudinal direction in the inner part of the cylindrical substrate 1c can occur no matter how the cylindrical substrate 1c is arranged. Because of this, it is preferable to appropriately adjust the flow direction of the air in the heating and drying oven in the drying step of the coated film so that a gradient of the concentration of the solvent vapor does not occur in the inner part of the substrate, according to a direction in which the substrate is arranged.

(6) Silicone Rubber Elastic Layer

The silicone rubber elastic layer 1d functions as an elastic layer which is carried on the fixing member in order to give a uniform pressure to the toner image and the unevenness of the paper, at the time of fixing. In order that the silicone rubber elastic layer 1d develops such a function, as the material thereof, it is preferable to use an addition reaction crosslinking type of liquid silicone rubber, for reasons of being easy to process, being capable of being processed with high dimensional accuracy, and not producing a reaction by-product at the time of heat curing. In addition, the reason is because the elasticity can be adjusted by adjusting the degree of crosslinking according to the type and addition amount of the filler, which will be described later.

In general, the addition reaction crosslinking type of liquid silicone rubber contains organopolysiloxane having an unsaturated aliphatic group, organopolysiloxane having active hydrogen bonded to silicon, and a platinum compound as a crosslinking catalyst.

The organopolysiloxane having the active hydrogen bonded to silicon forms a crosslinked structure by a reaction with an alkenyl group of the organopolysiloxane component having the unsaturated aliphatic group, due to a catalytic action of the platinum compound.

The silicone rubber elastic layer 1d may contain a filler for the enhancement of thermal conductivity, reinforcement, enhancement of heat resistance of the fixing belt, and the like.

In particular, for the purpose of improving the thermal conductivity, it is preferable that the filler has high thermal conductivity. Specific examples thereof include inorganic substances, particularly metals and metal compounds.

Specific examples of the highly thermally conductive filler include the following substances: silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe) and nickel (Ni).

These substances may be used alone or in a mixture of two or more types thereof. The average particle size (medium diameter) of the highly thermally conductive filler is preferably 1 μm or larger and 50 μm or smaller, from the viewpoints of being easy to handle, being excellent in dispersibility, and the like. In addition, as for the shape, a spherical shape, a ground shape, a plate shape, a whisker shape or the like is used, and the spherical shape is preferable from the viewpoint of being excellent in the dispersibility.

The range of thickness of the silicone rubber elastic layer is preferably 100 μm or larger and 500 μm or smaller, and is more preferably 200 μm or larger and 400 μm or smaller, from the viewpoints of the contribution of the fixing belt to the surface hardness, and the efficiency of thermal conduction to the unfixed toner at the time of fixing.

In the following Examples and Comparative Examples, an alumina particle was used as the highly thermally conductive filler; and the thermal conductivity of the elastic layer 1d was set to 1.0 W/mK, and the thickness was set to 300 μm.

(7) Fluororesin Release Layer

As the fluororesin release layer, for example, the following resin molded into a tubular shape is used. Tetrafluoroethylene-perfluoro(alkyl vinyl ether) copolymer (PFA), polytetrafluoroethylene (PTFE), tetrafluoroethylene-hexafluoropropylene copolymer (FEP), or the like. Among the above resins, PFA is preferable from the viewpoint of being excellent in moldability and toner releasability.

It is preferable to set the thickness of the fluororesin release layer to 50 μm or smaller. This is because, upon lamination, the fluororesin release layer maintains the elasticity of the silicone rubber elastic layer of a lower layer, and can suppress that the surface hardness becomes excessively high as a fixing member.

The inner surface of the fluororesin tube can be subjected to sodium treatment, excimer laser treatment, ammonia treatment or the like in advance, and thereby can enhance the adhesiveness.

In the present Example, a PFA tube having a thickness of 20 μm was used, which was obtained by extrusion molding.

The inner surface of the tube is treated with ammonia in order to enhance wettability with an adhesive agent, which will be described later.

The silicone rubber adhesive layer that fixes the PFA tube 1e serving as the fluororesin release layer to the silicone rubber elastic layer 1d is formed of a cured product of an addition curing type silicone rubber adhesive agent which has been applied to the surface of the silicone rubber elastic layer 1d. Then, the addition curing type silicone rubber adhesive agent contains an addition curing type silicone rubber that is blended with a self-adhesive component represented by a silane which has a functional group such as an acryloxy group, a hydrosilyl group (SiH group), an epoxy group or an alkoxysilyl group.

Next, an addition curing type silicone rubber adhesive agent is cured and bonded by heating in a heating unit such as an electric furnace for a predetermined time; and both end portions are cut to a desired length, and thereby a fixing belt serving as the fixing member of the present Example can be obtained.

According to one aspect of the present disclosure, a fixing belt can be obtained in which the surface roughness of the inner peripheral surface is more uniformalized in the longitudinal direction. In addition, according to another aspect of the present disclosure, a fixing apparatus can be obtained which can stably form a high-quality electrophotographic image.

EXAMPLES

The fixing belt according to the present disclosure will be more specifically described below, with reference to Examples. It should be noted that the fixing belt according to the present disclosure is not limited to only the configuration embodied in the Examples. In addition, in the following Examples, the term "part" means "part by mass" unless otherwise specified.

Example 1

As a substrate 1c having an endless shape, a substrate made from stainless steel (SUS304) was prepared, which had an inner diameter of 24 mm and a thickness of 30 mm.

In addition, as a filler, mica (trade name: Micromica MK-100, produced by Katakura & Co-op Agri Corporation) was prepared. The "Micromica MK-100" had an aspect ratio of 30 to 50, and as for the particle size, D50 (median diameter) was 4.5 µm.

Next, "U-varnish-A", "U-varnish-S301", and "U-varnish-S" (all trade names, produced by Ube Industries, Ltd.) were prepared as a polyamic acid, and these were mixed at a mass ratio of 5:3:2 to prepare a solution of a polyimide precursor. A coating liquid for forming a sliding layer was prepared by adding 3 parts by mass of the above mica to 100 parts by mass of the above solution of the polyimide precursor, and dispersing the mixture in three rolls. The coating liquid was applied to the inner peripheral surface of the substrate by a ring coating method so that the thickness becomes 77 µm, and thereby a coated film was formed.

The substrate 1c having the coated film formed on the inner peripheral surface was charged into a heating and drying oven illustrated in FIG. 5, and the coated film was dried.

In an unillustrated flow path in a heating cylinder 32, high-temperature oil having a temperature of 180° C. was allowed to flow from a vertically lower part to a vertically upper part. At this time, a temperature in the inner part of the drying oven was 140 to 160° C. In this drying step, N-methylpyrrolidone (hereinafter also referred to as NMP) volatilized which was a solvent contained in the solution of the polyimide precursor, and the concentration of NMP in the inner part of the heating and drying oven became higher in the vertically lower part than the vertically upper part in the heating and drying oven. When drying is proceeded in this state, the drying speed of the coated film positioned in the vertically lower part (1cL) of the cylindrical substrate 1c becomes slower than the drying speed of the coated film positioned in the vertically upper part (1cU), and as a result, the surface roughness of the coated film after having been dried results in being different in the longitudinal direction thereof. Then, in the present Example, air was allowed to flow at a wind velocity of 0.5 m/s from the vertically upper part to the vertically lower part in the heating and drying oven, in order to eliminate the concentration gradient of NMP in the inner part of the substrate. Then, in this state, the coated film was heated for 300 seconds, and was dried.

Subsequently, the dried coated film was baked at a temperature of 205° C. for 30 minutes, and was subsequently baked at a temperature of 250° C. for 15 minutes; furthermore, was heated to a temperature of 350° C. for 15 minutes and was baked at a temperature of 350° C. for 15 minutes; and the polyimide precursor caused a reaction and formed a polyimide-containing film. This polyimide-containing film as it is was used as the sliding layer.

Next, the outer peripheral surface of the cylindrical substrate 1c was coated with a silicone primer (trade name: DY39-051 liquid A/liquid B, produced by Dow Corning Toray Co., Ltd.), and the resultant substrate was heated at a temperature of 200° C. for 5 minutes for curing. Next, the cured primer was coated with an addition curing type liquid silicone rubber of which the thickness became 300 µm, the resultant liquid silicone rubber was heated at a temperature of 200° C. for 30 minutes to form an elastic layer 1d containing the silicone rubber. Furthermore, a PFA tube having a thickness of 20 µm was bonded and fixed to the outer peripheral surface thereof, as a fluororesin release layer 1e, with the use of a silicone adhesive agent (trade name: SE1819CV liquid A/liquid B, produced by Dow Corning Toray Co., Ltd.). Thus, a fixing belt according to Example 1 was obtained.

Example 2

The mica prepared in Example 1 was pulverized by a beads mill, and a mica having an aspect ratio of 5 (hereinafter also referred to as "pulverized mica") was prepared. A fixing belt was produced in the same manner as in Example 1, except that 4 parts by mass of the pulverized mica thus obtained was added to 100 parts by mass of the solution of the polyimide precursor.

Example 3

The mica in Example 1 was changed to fluorophlogopite mica (aspect ratio: 80, average particle diameter: 8 µm), and the amount of fluorophlogopite mica to be added was set to 4.5 parts by mass per 100 parts by mass of the solution of the polyimide precursor. Except for these, fixing belt was produced in the same manner as in Example 1.

Comparative Example 1

A ventilation wind velocity in the heating and drying oven in the drying step of the coated film in Example 1 was changed to 0.2 m/s. A fixing belt was produced in the same manner as in Example 1, except for the change.

Comparative Example 2

In the hot-air circulating oven used in the drying step in Example 1, the length of the cylindrical substrate 1c having the inner surface coated was oriented to a direction perpendicular to the circulation direction of the hot air so that warm wind does not pass through the inside of the cylindrical substrate 1c. In other words, the cylindrical substrate 1c was dried in such a state that the ventilation wind velocity flowing in the inside thereof was set at 0 m/s. A fixing belt was produced in the same manner as in Example 1, except for the orientation.

Comparative Example 3

A fixing belt was produced in the same manner as in Example 3, except that the amount of fluorophlogopite mica to be blended with the solution of the polyimide precursor was set to 3 parts by mass.

Example 4

A coated film of a coating material for forming the sliding layer was formed on the inner peripheral surface of the cylindrical substrate 1c in the same manner as in Example 1, except that the coating liquid prepared in Comparative Example 3 was used as the coating material for forming the sliding layer. A polyimide-containing film was formed in the same manner as in Example 1, except that the ventilation wind velocity was changed to 1.0 m/s in the drying step of the coated film. For information, in the polyimide-containing film obtained here, the convection type of cell structure was not formed, because the ventilation wind velocity in the drying step of the coated film was set to 1.0 m/s. Subsequently, the inner peripheral surface of the polyimide-containing film was polished in the longitudinal direction and the circumferential direction with the use of a lapping film #400, and a cell structure was formed by polishing marks; and the resultant polyimide-containing film was used as the sliding layer according to the present disclosure. After that, an elastic layer and a PFA surface layer were formed on the outer peripheral surface of the cylindrical substrate $1c$ in the same manner as in Example 1, and a fixing belt was obtained.

<Evaluation>

The fixing belts according to Examples 1 to 4 and Comparative Examples 1 to 3 were subjected to the following evaluations 1 to 4.

[Evaluation 1: Observation of Sliding Layer]

Figure 6A:
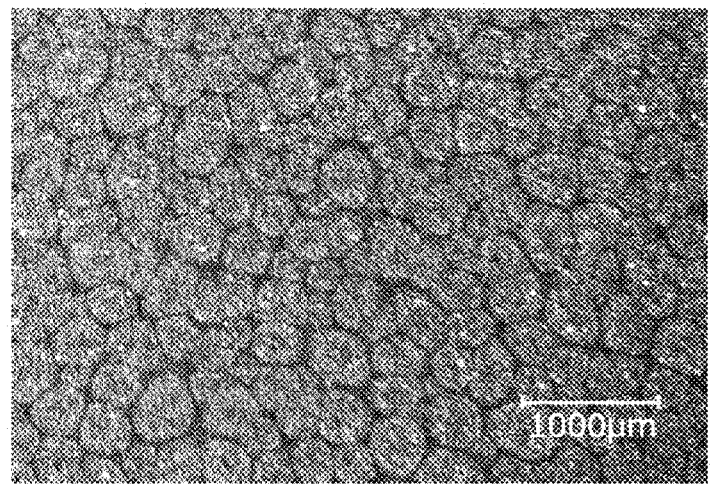
FIG. 6A and FIG. 6B illustrate a view illustrating a cell structure occurring in a sliding layer.
Figure 6B:
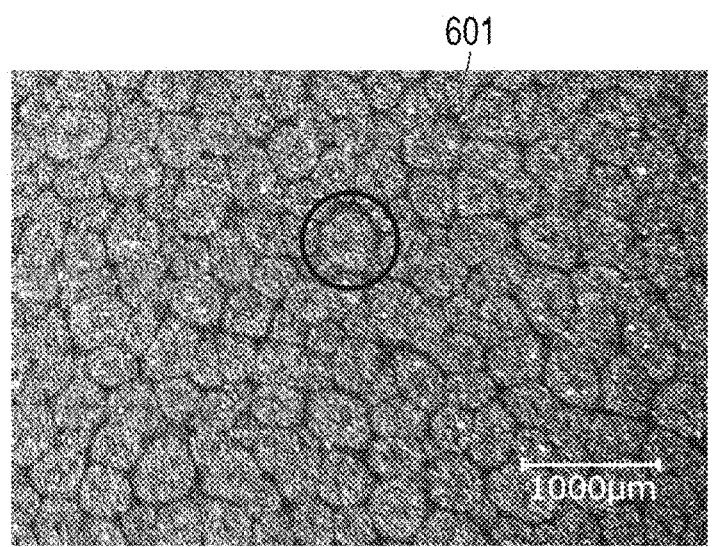

The cylindrical substrates $1c$ having the sliding layers formed thereon according to Examples and Comparative Examples, respectively, which were produced by the above described methods, were cut open, and the second surfaces of the respective sliding layers were observed at a magnification of 100 times with the use of a digital microscope (trade name: VHX 4000, manufactured by Keyence Corporation). FIGS. 6A and 6B are photographs of the inner peripheral surface of the sliding layer according to Example 1. FIG. 6B illustrates one cell structure in the photograph illustrated in FIG. 6A. As is illustrated in FIGS. 6A and 6B, a plurality of cell structures 601 were observed on the inner peripheral surface of the sliding layer. An area of each cell illustrated in FIGS. 6A and 6B was measured. The areas of the cells were measured in three regions among seven regions that were obtained by dividing the substrate $1c$ on which the sliding layer $1a$ was formed, into seven equal parts in the longitudinal direction. FIG. 7 illustrates the regions that were obtained by dividing the cylindrical substrate $1c$ into seven equal parts in the longitudinal direction. An A1 side of the length was determined to be a vertically downward direction of the heating and drying oven, and an A3 side of the length was determined to be a vertically upward direction of the heating and drying oven.

Table 1 shows the average area of cells in the A1 region ($1c$L in FIG. 5), A2 region ($1c$M in FIGS. 5), and A3 region ($1c$U in FIG. 5) illustrated in FIG. 7, and a coefficient of variation of cell areas in all regions. For information, the A1 region and the A3 region correspond to the end regions Y and Z, and the A2 region corresponds to the central region X. As a result, in Examples 1 to 3, the coefficient of variation of the cell areas in each region of A1, A2 and A3 was 25% or smaller.

In Comparative Example 1 in which the ventilation wind velocity was small and in Comparative Example 2 in which ventilation was not performed, the areas of the cells were greatly different between A1 and A3 which were the longitudinal ends. This is because the evaporated NMP stayed at a lower side of the drying oven due to insufficient ventilation wind velocity, the number of cells having a small area increased at the lower side of the drying oven, and the cell areas were different between the upper and lower sides (A1 and A3) in the longitudinal direction.

In addition, in Comparative Example 3, the cell area could not be measured because the aspect ratio of the mica was large, accordingly the mica was insufficient in the A3 region (upper side), and a region in which the cell structure was not generated occupied the majority of the region.

In Example 4, the ventilation wind velocity was increased as described above, and a convection type of cell structure was not formed in the polyimide-containing film. However, the inner peripheral surface of the polyimide-containing film was polished, thereby a plurality of cell structures was formed by polishing marks, and the resultant polyimide-containing film was used as a sliding film. As a result, the coefficient of variation of the cell areas in each region of A1, A2 and A3 on the inner peripheral surface of the sliding film according to Example 4 was 25% or less.

TABLE 1

| | Filler (mica) | | Flow velocity | | Average area of cells ($\mu m^2$) | | | Coefficient of variation |
|---|---|---|---|---|---|---|---|---|
| | Addition amount (parts by mass) | Aspect ratio | of air when coated film is dried (m/s) | Remarks | Region A1 | Region A2 | Region A3 | of cell areas (%) |
| Example 1 | 3.0 | 50 | 0.5 | — | 289.7 | 302.9 | 316.2 | 21.2 |
| Comparative Example 1 | 3.0 | 50 | 0.2 | — | 158.5 | 215.6 | 272.7 | 91.3 |
| Comparative Example 2 | 3.0 | 50 | 0.0 | — | 128.1 | 193.0 | 257.8 | 103.7 |
| Example 2 | 4.0 | 5 | 0.5 | — | 321.2 | 316.8 | 308.5 | 17.8 |
| Example 3 | 4.5 | 80 | 0.5 | — | 341.1 | 347.3 | 365.8 | 19.7 |
| Comparative Example 3 | 3.0 | 80 | 0.5 | — | 375.1 | 381.3 | — | — |
| Example 4 | 3.0 | 80 | 1.0 | Polished | 0.311 | 0.367 | 0.306 | 24.2 |

[Evaluation 2: Arithmetic Mean Roughness Ra of Inner Peripheral Surface of Sliding Layer]

As for the surface roughness Ra of the inner peripheral surface of the sliding layer, an arithmetic mean roughness Ra (μm, JIS B0601) was measured with the use of a surface roughness measuring machine (trade name: Surfcorder, manufactured by Kosaka Laboratory Ltd.). The measurement conditions were determined to be an evaluation length of 4 mm, a cut-off value of 0.8 mm, and a feed speed of 0.1 mm/s. The measurement was performed on the A1 region ($1c$L in FIG. 5), the A2 region ($1c$M in FIG. 5) and the A3 region ($1c$U in FIG. 5) illustrated in FIG. 7. Surface roughness RaX of the A1 region, surface roughness RaY of the A2 region, and surface roughness RaZ of the A3 region are shown in Table 2. In addition, values of |RaX-RaY|, |RaY-RaZ| and |RaX-RaZ| are also shown in Table 2.

TABLE 2

| | A1 RaX (μm) | A2 RaY (μm) | A3 RaZ (μm) | \|RaX − RaY\| (μm) | \|RaY − RaZ\| (μm) | \|RaX − RaZ\| (μm) |
|---|---|---|---|---|---|---|
| Example 1 | 0.50 | 0.45 | 0.41 | 0.05 | 0.04 | 0.09 |
| Comparative Example 1 | 0.92 | 0.74 | 0.55 | 0.18 | 0.19 | 0.37 |
| Comparative Example 2 | 1.02 | 0.81 | 0.60 | 0.21 | 0.21 | 0.42 |
| Example 2 | 0.35 | 0.35 | 0.31 | 0.00 | 0.04 | 0.04 |
| Example 3 | 0.33 | 0.31 | 0.25 | 0.02 | 0.06 | 0.08 |
| Comparative Example 3 | 0.22 | 0.20 | 0.09 | 0.02 | 0.11 | 0.13 |
| Example 4 | 0.28 | 0.29 | 0.27 | 0.01 | 0.02 | 0.01 |

The sliding layers according to Example 1 and Comparative Examples 1 and 2 were formed with the use of the coating material for forming the sliding layer, which was obtained by mixing 3 parts by mass of mica having an aspect ratio of 50 with 100 parts by mass of the solution of the polyimide precursor.

However, in Comparative Example 1, the ventilation in the inside of the substrate in the drying step of the coated film was insufficient, as described in Evaluation 1, accordingly unevenness of drying for the coated film occurred in the longitudinal direction of the substrate, and the areas of the cell structures varied on the inner peripheral surface of the sliding layer. As a result, the differences of the arithmetic mean roughnesses among each region exceeded 0.1 μm, which were specifically the difference between RaX and RaY, the difference between RaY and RaZ, and the difference between RaX and RaZ. In addition, in Comparative Example 2, the inside of the substrate was not ventilated in the drying step of the coated film, and accordingly the areas of the cell structures on the inner peripheral surface of the sliding layer more varied than those in Comparative Example 1. As a result, the differences of the arithmetic mean roughnesses among each region also became further larger than those in Comparative Example 1, which were specifically the difference between RaX and RaY, the difference between RaY and RaZ, and the difference between RaX and RaZ.

On the other hand, the dispersion of the areas of the cell structures in the longitudinal direction of the fixing belt according to Example 1 was small, on the inner peripheral surface of the sliding layer. Because of this, the differences of the arithmetic mean roughnesses among each region were as small as 0.1 μm or smaller, which were specifically the difference between RaX and RaY, the difference between RaY and RaZ, and the difference between RaX and RaZ.

Next, in Example 2, the mica having the aspect ratio of 5 was used as the filler. As a result, the arithmetic mean roughness Ra of the inner peripheral surface of the sliding layer was smaller than that of the fixing belt according to Example 1. In addition, in Example 3, the mica having the aspect ratio of 80 was used as the filler, and the amount of the mica blended with 100 parts by mass of the solution of the polyimide precursor was set to 4.5 parts by mass. As a result, the value of the arithmetic mean roughness Ra of the inner peripheral surface of the sliding layer was smaller than that of the fixing belt according to Example 1. From these results, it is understood that the orientation of the filler due to the convection in the coated film of the coating material for forming the sliding layer is affected by the aspect ratio of the filler. In other words, it is understood that when the surface of the inner peripheral surface of the sliding layer is roughened by utilization of the convection in the coated film of the coating material for forming the resin layer, the surface roughness of the inner peripheral surface can be controlled by the aspect ratio of the filler.

In the fixing belt according to Comparative Example 3, the cell structure was not formed in the region A3, as described in the result of evaluation 1, and as a result, the arithmetic mean roughness RaZ was small which was measured in the region A3. As a result, the difference between RaY and RaZ and the difference between RaX and RaZ also exceeded 0.1 μm.

In Example 4, the arithmetic mean roughnesses RaX, RaY and RaZ of the inner peripheral surface of the sliding layer were uniform, because the cell structures were formed in the sliding layer by cells formed by polishing.

[Evaluation 3: Image Evaluation and Scuff Resistance]

The image was evaluated with the use of the belt heating type of fixing apparatus 100 illustrated in FIG. 2, in which the fixing belts according to Examples and Comparative Examples were each mounted. In such a state that a pressing force at one end of a fixing belt stay 5 was controlled to be approximately 156.8 N and a total pressing force at both ends was controlled to be approximately 313.6 N (32 kgf), the pressure roller was rotationally driven so that a moving speed (peripheral speed) of the surface thereof became 246 mm/sec. In a state that a surface temperature of a paper passing portion of the fixing belt was adjusted to 170° C., paper having the same size (A4 width) was passed through the paper passing portion. For information, 1.2 g of grease (trade name: Molykote HP-300, produced by DuPont Toray Specialty Materials K.K.) was applied to the inner surface of the fixing belt, as a lubricant.

Next, a method for evaluating a scuff resistance of a fixed image will be described. As a fixing rubbing test, a toner mass per unit area of an A4 plain paper (105 g/m$^2$) for a copying machine was adjusted to become 1.0 mg/cm$^2$, and an image having a solid image of 10 mm×10 mm for density measurement was output. Then, a lens-cleaning paper was placed on the obtained fixed image, and in a state that a weight of 50 g/cm$^2$ was mounted on the lens-cleaning paper, the lens-cleaning paper was reciprocated five times. After that, image densities were measured in regions which corresponded to regions A1, A2 and A3 of the fixing belt in the image, and a rate of diminution in the density in each region was determined, based on the following expression. The image density was measured with the use of a Macbeth reflection densitometer RD918. Then, the rate of diminution in the density in each of regions A1, A2 and A3 was evaluated, based on the following criteria. The evaluation results are shown in Table 3.

Rate of diminution in density=(image density before rubbing−image density after rubbing)/image density before rubbing Rank A: Rate of diminution in the density is lower than 5%

Rank B: Rate of diminution in the density is 5% or higher and lower than 10%

Rank C: Rate of diminution in the density is 10% or higher

TABLE 3

| | Evaluation rank of scuff resistance Region in image | | |
|---|---|---|---|
| | Region corresponding to A1 | Region corresponding to A2 | Region corresponding to A3 |
| Example 1 | Rank A | Rank A | Rank A |
| Comparative Example 1 | Rank B | Rank A | Rank A |
| Comparative Example 2 | Rank C | Rank A | Rank A |
| Example 2 | Rank A | Rank A | Rank A |
| Example 3 | Rank A | Rank A | Rank A |
| Comparative Example 3 | Rank A | Rank A | Rank A |
| Example 4 | Rank A | Rank A | Rank A |

As shown in Table 3, as for the electrophotographic image which was fixed by each of the fixing belts according to Examples 1 to 4, the scuff resistance was A rank. Specifically, all of the regions A1, A2 and A3 were ranked A, and the whole surface of the image was fixed uniformly and adequately.

On the other hand, in the electrophotographic image which was fixed by the fixing belt according to Comparative Example 1, there existed a rank A region and a rank B region. This result is considered to be caused by that the difference in the arithmetic mean roughness of the inner peripheral surface of the sliding layer in the electrophotographic belt according to Comparative Example 1 exceeded 0.1 μm between each region, and accordingly the difference occurred in the fixing states of the toners between the regions of the images corresponding to the regions. In addition, in the image according to Comparative Example 1, the scuff resistance of the region corresponding to the region A1 of the fixing belt was poor. This reason is considered to be because in the region A1 on the inner peripheral surface of the fixing belt according to Comparative Example 1, the arithmetic mean roughness value was large, and the layer thickness of the grease in this portion was thick, and accordingly, the supply of heat to the unfixed toner became insufficient.

In the electrophotographic image fixed by the fixing belt according to Comparative Example 2, there existed a region of rank A, a region of rank B, and a region of rank C. This result is considered to be caused by that the difference in the arithmetic mean roughness of the inner peripheral surface of the sliding layer in the electrophotographic belt according to Comparative Example 2 exceeded 0.2 μm between each region, and accordingly, a great difference occurred in the fixing state of the toner between the regions of the images corresponding to the regions. In addition, in the image according to Comparative Example 2, the scuff resistance of the region corresponding to the region A1 of the fixing belt was poor. This reason is considered to be because in the region A1 on the inner peripheral surface of the fixing belt according to Comparative Example 1, the arithmetic mean roughness value was especially large, the layer thickness of the grease in this portion became thick, and accordingly, the supply of heat to the unfixed toner became insufficient.

In addition, the electrophotographic image fixed by the fixing belt according to Comparative Example 3 was rank A in all of the regions. The reason is considered to be because as for the arithmetic mean roughness of the inner peripheral surface of the fixing belt according to Comparative Example 3, the difference between each region exceeded 0.1 μm, but the value of the arithmetic mean roughness itself was small as 0.22 μm or smaller in any of the regions, and a great difference did not occur in fixability.

[Evaluation 4: Durability Evaluation of Fixing Belt]

Subsequently, the fixing belts of Examples 1 to 4 and Comparative Example 3 were subjected to the following evaluation, of which the result was adequate in Evaluation 3.

Durability evaluation was performed with the use of the belt heating type of fixing apparatus 100 illustrated in FIG. 2, similarly to the above described image evaluation. In such a state that a pressing force at one end of a fixing belt stay 5 was controlled to be approximately 156.8 N and a total pressing force at both ends was controlled to be 313.6 N (32 kgf), the pressure roller was rotationally driven so that a moving speed (peripheral speed) of the surface thereof became 246 mm/sec. In a state that a surface temperature of a paper passing portion of the fixing belt was adjusted to 170° C., paper having the same size (A4 width) was passed through the paper passing portion. For information, 1.2 g of grease (trade name: Molykote HP-300, produced by DuPont Toray Specialty Materials K.K.) was applied to the inner surface of the fixing belt, as a lubricant.

Then, a state of occurrence of an abnormal noise of the fixing belt due to self-excited vibration associated with the occurrence of stick-slip was evaluated according to the following criteria, at a moving speed (peripheral speed) of the surface of the pressure roller of 120 mm/sec which is the lowest speed. This evaluation was performed in the initial state, and at the time when 500000 sheets of paper (trade name: GF-C081; 80 g/m² paper produced by Nippon Paper Industries Co., Ltd.) were passed through. The results are shown in Table 4. In Table 4, "Y" means that the abnormal noise did not occur, and "N" means that the abnormal noise occurred.

TABLE 4

| | Initial state | 500000 sheets |
|---|---|---|
| Example 1 | Y | Y |
| Example 2 | Y | Y |
| Example 3 | Y | Y |
| Example 4 | Y | Y |
| Comparative Example 3 | N | N |

In Examples 1 to 4, the abnormal noise did not occur both at the initial stage and after the endurance of 500000 sheets, and a load torque did not exceed 800 mN·m.

On the other hand, in Comparative Example 3, the abnormal noise occurred from the initial stage. This is considered to be caused by that the abutting state between the inner peripheral surface of the fixing belt and the heater became non-uniform in the longitudinal direction of the fixing belt, because the differences among the arithmetic mean roughnesses of the inner peripheral surface of the fixing belt in the regions A1, A2 and A3 exceeded 0.1 μm.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-075335, filed Apr. 27, 2021, and Japanese Patent Application No. 2022-047656, filed Mar. 23, 2022, which are hereby incorporated by reference herein in their entirety.

What is claimed is:

1. A fixing belt comprising: a base having an endless shape; and a resin layer covering a surface on an inner peripheral side of the base,
   the resin layer comprising a resin and a filler, the resin layer having a second surface opposite to a first surface facing the base, the second surface having cell structures, and
   the second surface being roughened with the filler, wherein
   when a length of the fixing belt in a longitudinal direction is defined as L, a region whose center is a middle point of the fixing belt in the longitudinal direction and having a width of L/7 is defined as a central region X, and regions having a width of L/7 from both ends of the fixing belt in the longitudinal direction toward the middle point are defined as end regions Y and Z respectively, and
   when arithmetic mean roughnesses of the second surface in the central region X and the end regions Y and Z are defined as RaX, RaY and RaZ respectively,
   a difference between RaX and RaY, a difference between RaY and RaZ, and a difference between RaX and RaZ are all 0.1 μm or smaller, and
   a coefficient of variation of areas of the cell structures contained in each of the central region X and the end regions Y and Z is 25% or smaller.

2. The fixing belt according to claim 1, wherein each of the RaX, RaY and RaZ is 0.15 μm to 0.70 μm.

3. The fixing belt according to claim 1, wherein an aspect ratio of the filler is 5 to 50.

4. The fixing belt according to claim 1, wherein the filler is mica and the resin is a polyimide resin.

5. A fixing belt comprising: a base having an endless shape; and a resin layer covering a surface on an inner peripheral side of the base,
   the resin layer being a cured film of a coated film of a coating material for forming the resin layer, the coating material containing a filler and a resin raw material, the resin layer having a second surface opposite to a first surface facing the base, the second surface having cell structures derived from a convection type cell structure, and
   the second surface being roughened with the filler, wherein
   when a length of the fixing belt in a longitudinal direction is defined as L, a region whose center is a middle point of the fixing member in the longitudinal direction and having a width of L/7 is defined as a central region X, and regions having a width of L/7 from both ends of the fixing belt in the longitudinal direction toward the middle point are defined as end regions Y and Z respectively,
   a coefficient of variation of areas of the cell structures contained in each of the central region X and the end regions Y and Z is 25% or smaller.

6. The fixing belt according to claim 5, wherein each of the RaX, RaY and RaZ is 0.15 μm to 0.70 μm.

7. The fixing belt according to claim 5, wherein an aspect ratio of the filler is 5 to 50.

8. The fixing belt according to claim 5, wherein the filler is mica and the resin is a polyimide resin.

9. A fixing apparatus comprising a fixing belt, the fixing belt comprising a base having an endless shape and a resin layer covering a surface on an inner peripheral side of the base, wherein
   the resin layer comprises a resin and a filler,
   the resin layer has a second surface opposite to a first surface facing the base,
   the second surface has cell structures, wherein
   the second surface is roughened with the filler; and wherein
   when a length of the fixing belt in a longitudinal direction is defined as L, a region whose center is a middle point of the fixing member in the longitudinal direction and having a width of L/7 is defined as a central region X, and regions having a width of L/7 from both ends of the fixing belt in the longitudinal direction toward the middle point are defined as regions Y and Z respectively, and
   arithmetic mean roughnesses of the second surface in the central region X and the end regions Y and Z are defined as RaX, RaY and RaZ respectively,
   a difference between RaX and RaY, a difference between RaY and RaZ, and a difference between RaX and RaZ are all 0.1 μm or smaller, and
   a coefficient of variation of areas of the cell structures contained in each of the central region X and the end regions Y and Z is 25% or smaller.

* * * * *